United States Patent [19]
Walworth et al.

[11] 3,802,863
[45] Apr. 9, 1974

[54] HERBICIDAL COMPOSITIONS AND PROCESSES OF CONTROLLING UNDESIRABLE PLANT SPECIES IN THE PRESENCE OF CROPS

[75] Inventors: Bryant Leonidas Walworth, Pennington; Albert William Lutz, Montgomery Twsp., County of Somerset, both of N.J.

[73] Assignee: American Cyanamid Company, Stamford, Conn.

[22] Filed: Mar. 4, 1971

[21] Appl. No.: 121,163

[52] U.S. Cl. .................................................. 71/103
[51] Int. Cl. ............................................ A01n 9/14
[58] Field of Search ...................................... 71/103

[56] References Cited
UNITED STATES PATENTS
3,453,099   7/1969   Popoff et al. .......................... 71/103

FOREIGN PATENTS OR APPLICATIONS
1,128,217   9/1968   Great Britain ......................... 71/103

OTHER PUBLICATIONS

Shein et al., Chem. Abst. Vol. 66 (1967) 94446n.

*Primary Examiner*—Lewis Gotts
*Assistant Examiner*—Catherine L. Mills
*Attorney, Agent, or Firm*—H. G. Jackson

[57] ABSTRACT

Herbicidal compositions and methods of controlling undesirable plant growth in the presence of important economic crops, using 2-nitro-4-[(trifluoromethyl)sulfonyl]phenol are disclosed.

3 Claims, No Drawings

HERBICIDAL COMPOSITIONS AND PROCESSES OF CONTROLLING UNDESIRABLE PLANT SPECIES IN THE PRESENCE OF CROPS

This invention relates to herbicidal compositions and to methods of controlling undesirable plant growth therewith in the presence of important economic crops.

Many compounds are known which demonstrate preemergence and postemergence herbicidal activity. In general, however, they are not widely selective and thus they cannot be employed to control the growth of undesirable plant life in the presence of economically or aesthetically important plants such as food crops and ornamental plants.

Furthermore, many compounds which possess herbicidal activity are so expensive to manufacture that their use with large acreages is prohibited. A further problem encountered with many herbicidal compounds is the need to employ them at such high rates of application in order to achieve the desired herbicidally effective results, that their use creates a serious polluting effect upon the environment.

Accordingly, it is an object of the present invention to provide methods and compositions useful therein for the control of undesirable plant growth in the presence of important economic crops. It is a further object to provide a process for the postemergence control and selective preemergence control of monocot and dicot weeds in the presence of important economic crops such as, for example, corn, cotton, soybeans and sugar beets. These and other objects and advantages of the present invention are further described below.

In accordance with this invention, it has been discovered that the control of undesirable plant species is achieved in the presence of planted and growing crops by applying to the planted area to be protected from such undesirable plant growth a herbicidally effective amount of a compound having the following formula:

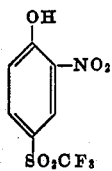

This compound can be readily prepared by heating 2-nitro-4-[(trifluoromethyl)sulfone]anisole with pyridine hydrochloride. The anisole compound is in turn readily prepared by reacting a solution of sodium methoxide with 3-nitro-4-bromo-phenyltrifluoromethyl sulfone. The latter compound is well known in the chemical literature.

Several alternative routes which are suitable for use in the preparation of the subject phenol and related compounds are described in a number of publications including: Chemical Abstracts 53: 21765i (1959); Zhur. Obshchei. Khem. 36 (12) and J. Gen. Chem. U.S.S.R. 36: 2135 (1966).

British Pat. No. 1,128,217 to Shell International Research Co. also discloses the preparation of several p-sulfonyl-phenol herbicides, the most preferred of which, namely, the 2,6-dihalo-4-(methylsulfonyl)-phenols, are compared to the compound of the present invention in Example 4.

It is generally preferred to employ the phenol in combination with conventional adjuvants, such as wetting or spreading agents, stickers, penetrants and emulsifiers; or, conventional solid or liquid diluents. The phenol may advantageously be formulated as a dust, dust concentrate, wettable powder, emulsifiable concentrate or as a granular product and applied to the foliage of plants or to the soil in which the plants are to be grown, using conventional applicators or soil incorporation equipment.

For postemergence uses, the phenol is applied to the foliage of the undesired plants in a herbicidally effective amount. Applications at rates of from about 0.33 to about 10.0 pounds per acre are generally preferred for this purpose. For use as a preemergence herbicide, the phenol is generally applied to the soil containing the seeds of the undesirable plant species. Applications at rates of from about 0.75 to about 9.0 pounds per acre are generally preferred for this purpose with rates of from about 0.75 to about 3.0 pounds per acre being especially preferred.

Dusts can be prepared by grinding from about 1% to 15% by weight of 2-nitro-4-[(trifluoromethyl)sulfonyl]phenol with from about 99% to 85% by weight of finely divided clay such as attapulgite, bentonite or kaolin, talc, diatomaceous earth, fullers earth or similar diluents normally employed for this type formulation. Dust concentrates are made up in similar fashion, but from about 15% to 75% by weight of the phenol is used.

Wettable powders are prepared in the same manner as dust concentrates, but generally about 1% to 5% by weight of a wetting agent, such as the oleic acid ester of sodium isothionate (Igepon AP-78) and 1% to 5% of a dispersant, such as the sodium salt of polymeric carboxylic acid (Tamol 731), is included in the formulation. In practice the wettable powder is usually dispersed in water and applied as a dilute suspension to the plants or soil where weed control is desired.

Emulsifiable concentrates can be prepared by dissolving, usually about 10% to 25% of the phenol in about 89% to 74% of an organic solvent such as methylisobutylketone, benzene, xylene, methylethylketone, cyclohexanone or the like and admixing therewith from about 1% to 5% of a nonionic-anionic emulsifier such as Mol 77L (by Wm. Cooper and Nephews). This is dispersed in water for application.

The granular formulations can be prepared by dissolving the phenol in an organic solvent such as mentioned above, and sprayed on a sorptive granular carrier such as ground corn cobs, finely divided attaclay, kaolinite, or the like, or it may be mixed with a binder or sticking agent and applied to a nonsorptive granule.

The following examples further illustrate the present invention but are not to be taken as being limitative thereof. In each case, the parts are by weight unless otherwise indicated.

EXAMPLE 1

Preparation of 2-Nitro-4-[(trifluoromethyl)sulfonyl]anisole

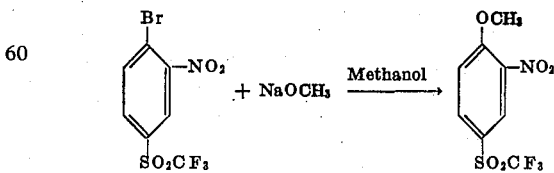

Sodium methoxide (13.0 g., 0.24 mole) dissolved in absolute methanol is added to a solution of 3-nitro-4-bromo-phenyltrifluoromethyl sulfone (40.0 g., 0.24 mole) in 500 ml. absolute methanol. The solution is brought to reflux for 2.5 hours after which the solvent is evaporated in vacuo. The solid obtained is recrystallized from 95% ethanol to yield 24.4 g. (71.2%) of 2-nitro-4-[(trifluoromethyl)sulfonyl]anisole, m.p. 76°–79°c.

Analysis Calculated for $C_8H_6F_3NO_5S$: C, 33.69; H, 2.12; F, 19.99; N, 4.91; S, 11.24. Found: C, 33.34; H, 2.12; F, 21.29; N, 4.25; S, 11.47.

EXAMPLE 2

Preparation of 2-Nitro-4-[(trifluoromethyl)sulfone]-phenol

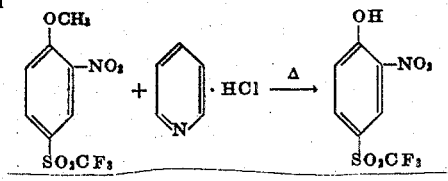

Pyridine hydrochloride (47.9 g., 0.042 mole) is heated at 190° for 15 minutes in an open flask. 2-Nitro-4-[(tri-fluoromethyl)sulfone] anisole (22.5 g., 0.079 mole) is added in portions and the mixture heated at 190° for 30 minutes. After cooling to room temperature, the mixture is diluted with water and then extracted with ether. Removal of the ether yielded the crude product which after recrystallization from 1:1 ethanol-water gives 15.5 g. (72.2%) of 2-nitro-4-[(trifluoromethyl)sulfone]phenol, m.p. 60°–62°C.

Analysis Calculated for $C_7H_4F_3NO_5S$: C, 31.00; H, 1.49; F, 21.02; N, 5.17; S, 11.82. Found: C, 31.56; H, 1.55; F, 22.92; N, 4.49; S, 12.04.

EXAMPLE 3

Postemergence Herbicidal Activity of 2-Nitro-4-[(trifluoromethyl)sulfone]phenol

The postemergence herbicidal activity of 2-nitro-4-[(trifluoromethyl)sulfone]phenol is demonstrated by the following tests, wherein a variety of monocotyledonous and dicotyledonous plants, including weeds and crop plants, are treated with the test compound dispersed in an aqueous-acetone mixture. In the tests, seedling plants are grown in jiffy flats for about two weeks. The test compound is dispersed in 50/50 by volume acetone/water mixtures in sufficient quantity to provide the equivalent of about 0.33, 1, 3 or 9 pounds per acre of active compound when applied to the plants through a spray nozzle operating at 40 psi. for a predetermined time. After spraying, the plants are placed on greenhouse benches and are cared for in the usual manner, commensurate with conventional greenhouse practices. Two weeks after teatment, the seedling plants are examined and rated according to the Herbitoxicity Index provided below. When these data are compared with data obtained for 2-nitro-4-[(trifluoromethyl)sulfonyl]anisole applied in the same manner at 10 pounds per acre, the uniqueness of the compound of the present invention is apparent. Data obtained are reported in Table I below.

Herbitoxicity Index

| | | |
|---|---|---|
| 9 | = 100% reduction in stand | |
| 9– | = 1 or 2 stunted plants remaining | |
| 8 | = 85– | < 100% reduction in stand |
| 7 | = 70– | < 85% reduction in stand |
| 6 | = 60– | < 70% reduction in stand |
| 5 | = 50– | < 60% reduction in stand |
| 4 | = 40– | < 50% reduction in stand |
| 3 | = 30– | < 40% reduction in stand |
| 2 | = 20– | < 30% reduction in stand |
| 1 | = 10– | < 20% reduction in stand |
| 0 | = no apparent effect | |
| s | = severe injury | |
| m | = moderate injury | |
| t | = trace to slight injury | |
| – | = no test | |
| c | = chlorosis | |
| g | = growth retarded | |
| a | = abnormal growth | |
| r | = regrowth | |

Plant Abbreviations

KO =Kochia
LA =Lambsquarters
Mu =Mustard
PI =Pigweed
BA =Barnyard grass
CR =Crabgrass
GRF =Green foxtail
WO =Wild Oats
COR =Corn
COT =Cotton
SOY =Soybean
SB =Sugar beets
TO =Tomato
WH =Wheat
BW =Bindweed
CT =Canada thistle
BT =Birdsfoot trefoil
A =Alfalfa
CW =Chickweed

TABLE I

| Structure | Treatment, lb./a. | Perennial weeds | | Annual weeds | | | | | | | | Crops | | | | | | | | |
|---|---|---|---|---|---|---|---|---|---|---|---|---|---|---|---|---|---|---|---|---|
| | | BW | CT | KO | LA | MU | RI | BA | CR | GRF | WO | COR | COT | SOY | SB | TO | WH | BT | A | CW |
| OH / –NO2 / $SO_2CF_3$ | 9 | 9 | 9 | 9 | 9 | 9 | 9 | 3 | 3 | 9 | 9 | 5m | 9 | 9– | 9 | | | | | |
| | 3 | 9r | 9 | 9 | 9 | 9 | 9 | t | t | 9 | 9 | 5m | 9 | 9– | 9 | | | | | |
| | 1 | 9r | 9 | 9– | 9– | 9 | 9 | t | t | 9– | t | 3 | t | m | 9 | | | 9 | 8 | 9– |
| | 0.33 | 0 | 9 | 9– | 9– | 9 | mg | t | t | t | t | 3 | t | t | 9 | | | | | |
| $OCH_3$ / –NO2 / $SO_2CF_3$ | 10 | | | 0 | 0 | 0 | 0 | 0 | | 0 | | 0 | | | | 0 | 0 | | | |

EXAMPLE 4

Selective Preemergence Herbicidal Activity of 2-Nitro-4-[(tri-fluoromethyl)sulfone]phenol The selective preemergence herbicidal activity of 2-nitro-4-[(trifluoromethyl)sulfone]phenol is demonstrated in the following tests. These tests also show the vast superiority of this phenol over related methylsulfonyl phenols such as 2,6-di-iodo-4-(methylsulphonyl)-phenol and 2,6-dibromo-4-(methylsulphonyl)phenol disclosed in British Pat. No. 1,128,217 to Shell International Research Co.

In the tests, seeds of a variety of monocotyledonous and dicotyledonous weeds and crop plants are separately mixed with potting soil and planted on top of approximately one inch of potting soil in separate pint cups. After planting, the cups are sprayed with the selected aqueous-acetone solution containing test compound in sufficient quantity to provide the equivalent of about 1.0, 1.5 or 2.0 pounds per acre of test compound per cup. The treated cups are then placed on greenhouse benches and cared for in accordance with greenhouse procedures. Three weeks after treatment, the tests are terminated and each cup is examined and rated according to Herbitoxicity Index set forth in the previous example. The tabulated results of these tests establish the herbicidal proficiency of the test compounds and are reported in Table II below.

ing. Seeds of the broadleaf weeds (i.e., pigweed, lambsquarters, smartweed, ragweed and jimpson weed) and grasses (i.e., foxtail and crabgrass) are broadcast over the plot and disked into the soil to assure heavy weed infestation. The plots, 5 ft. wide and 20 ft. long, are then planted with corn, soybeans, sorghum, cotton and sugar beets in rows approximately 10 inches apart. When plantings are complete, the plots are sprayed with an aqueous solution of the test compound using the sprayer to deliver the solutions essentially uniformly over the test plots. Untreated plots which have been similarly planted are employed as controls. At intervals of four weeks and six weeks after planting, the plots are examined and rated as to herbicidal activity according to the index set forth below. At both readings, control plots adjacent to test plots are heavily infested with all species of the broadleaf weeds and grasses employed in the tests. Data obtained are reported in Table III below.

From the data it can be seen that 2-nitro-4-[(trifluoromethyl)sulfonyl]phenol, applied at about 4 pounds per acre, gave excellent (i.e., 70% to 80%) control of broadleaf weeds with essentially no crop injury.

Herbitoxicity Index - Field Rating

0 = No Effect

TABLE II

| Structure | Treatment, lb./a. | Annual weeds | | | | | | | | Crops | | | | | |
|---|---|---|---|---|---|---|---|---|---|---|---|---|---|---|---|
| | | KO | LA | MU | PI | BA | CR | GRF | WO | COR | COT | SOY | SB | TO | WH |
| Applicants' compound: OH / NO₂ / SO₂CF₃ | 1.5 | 9 | 7 | 9— | 9 | ta | 7a | 5a | 0 | 0 | 0 | 0 | 0 | | |
| | 1.0 | 9 | 5g | 8g | 7 | ta | tg | 5a | 0 | 0 | 0 | 0 | 3 | | |
| | 1.0 | 8 | mg | 9 | 9— | ta | 0 | 0 | 0 | 0 | 0 | 0 | 3 | | |
| Shell Patent Br. 1,128,217: OH / I—I / SO₂CH₃ | 2.0 | 0 | 0 | 0 | 3 | 0 | 0 | 0 | tc | 0 | 0 | | 0 | 0 | |
| | 1.0 | 0 | 0 | 0 | 0 | 0 | 0 | 0 | 0 | 0 | 0 | | 0 | 0 | |
| OH / Br—Br / SO₂CH₃ | 2.0 | 0 | 0 | 0 | 0 | 0 | 0 | 0 | 9-c | 0 | 0 | tcg | ta | | |
| | 1.0 | 0 | 0 | 0 | 0 | 0, | 0 | 0 | 8 | 0 | 0 | 0 | ta | | |

EXAMPLE 5

Selective Preemergence Herbicidal Activity of 2-Nitro-4-[(trifluoromethyl)sulfone]phenol Selective preemergence herbicidal activity of 2-nitro-4-[(trifluoromethyl)sulfonyl]phenol is demonstrated in the following tests wherein test compound is dissolved in 50/50 acetone/water solutions and applied in dilute aqueous solution to seeded plots with a standard spraying apparatus operated so as to deliver 57 gal./acre of test solution which provides the equivalent of 2.0 or 4.0 lbs. of active ingredient/acre of seeded plot. The soil is prepared in the normal manner by plowing and harrow-

1 = 10%
2 = 20%
3 = 30%
4 = 40%
5 = 50%
6 = 60%
7 = 70%
8 = 80%
9 = 90%

Alteration by visual observation based on reduction in stand, reduction in fresh weight of foliage, malformation and plant injury, for example chlorosis.

A value of 3 or less is acceptable for crop selectivity.

10 = Complete Kill

X = Crop Not Injured

I = Significant Injury

K = Crop Killed

AGW = Annual Grass Weeds

ABW = Annual Broadleaf Weeds

TABLE III

| Interval/Weeks | Rate lbs./A | Sugar Beets | Cotton | Corn | Sorghum | Soybeans | AGW | ABW |
|---|---|---|---|---|---|---|---|---|
| 4 | 2 | 0 | 0 | 0 | 2 | 0 | 0 | 5 |
| 4 | 4 | 0 | 0 | 0 | 0 | 5 | 3 | 8 |
| 6 | 2 | — | — | 4 | 3 | — | 0 | 6 |
| 6 | 4 | 0 | — | 0 | 1 | — | 0 | 7 |

We claim:

1. A method for the preemergence control of undesirable plant species in the presence of planted crops comprising contacting the undesirable seeds thereof with a herbicidally effective amount of a compound of the formula:

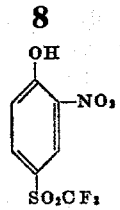

2. A method according to claim 1 for the selective preemergence control of undesirable plants comprising applying to soils utilized for the growing of agronomic crops and containing seeds of undesirable plants between about 0.75 and 9.0 pounds per acre of 2-nitro-4-[(trifluoromethyl)sulfonyl]phenol.

3. A method according to claim 2 wherein said phenol is applied to said soil at from about 0.75 to 3.0 pounds per acre.

* * * * *